(12) United States Patent
Onomura (10) Patent No.: US 8,848,093 B2
(45) Date of Patent: Sep. 30, 2014

(54) IMAGE-CAPTURING APPARATUS AND IMAGE-CAPTURING METHOD HAVING A VARIABLE FILTER EFFECT MODE

(75) Inventor: Kenichi Onomura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 440 days.

(21) Appl. No.: 13/204,449

(22) Filed: Aug. 5, 2011

(65) Prior Publication Data

US 2012/0033106 A1    Feb. 9, 2012

(30) Foreign Application Priority Data

Aug. 6, 2010 (JP) ................................. 2010-177420

(51) Int. Cl.
| | |
|---|---|
| *H04N 5/225* | (2006.01) |
| *H04N 5/232* | (2006.01) |
| *G03B 13/00* | (2006.01) |
| *G03B 17/00* | (2006.01) |

(52) U.S. Cl.
CPC ........... *H04N 5/23296* (2013.01); *H04N 5/232* (2013.01)
USPC ............................ 348/342; 348/345; 396/298

(58) Field of Classification Search
CPC .............. H04N 5/2254; H04N 5/2259; H04N 5/23219; H04N 5/23225; H04N 5/23296
USPC ............................ 348/342, 345, 374; 396/298
See application file for complete search history.

(56) References Cited

U.S. PATENT DOCUMENTS

| | | | | |
|---|---|---|---|---|
| 6,546,207 | B2 * | 4/2003 | Wakui | 396/298 |
| 7,142,780 | B2 * | 11/2006 | Katagishi | 396/54 |
| 2007/0153113 | A1 * | 7/2007 | Ueda et al. | 348/335 |
| 2007/0242940 | A1 * | 10/2007 | Yumiki et al. | 396/79 |
| 2009/0279192 | A1 * | 11/2009 | Harada et al. | 359/825 |
| 2010/0171837 | A1 * | 7/2010 | Pillman et al. | 348/187 |
| 2010/0194938 | A1 * | 8/2010 | Iwasa | 348/266 |
| 2011/0221917 | A1 * | 9/2011 | Cho et al. | 348/222.1 |

FOREIGN PATENT DOCUMENTS

| | | |
|---|---|---|
| JP | 2004-069783 | 3/2004 |
| JP | 2005-151349 | 6/2005 |
| JP | 2006-340070 | 12/2006 |
| JP | 2007-033482 | 2/2007 |
| JP | 2007-148537 | 6/2007 |
| JP | 2007-228605 | 9/2007 |

OTHER PUBLICATIONS

Office Action from corresponding Japanese Patent Application Serial No. 2010-177420, mailed Feb. 12, 2014 (2 pgs.) with English translation (4 pgs.).

* cited by examiner

*Primary Examiner* — Kelly L Jerabek
(74) *Attorney, Agent, or Firm* — John C. Pokotylo; Straub & Pokotylo (57) ABSTRACT

An image-capturing apparatus includes an imaging unit that generates RAW image data by capturing an object image, an image processing unit that generates color image data by implementing image processing on the RAW image data, a processing mode setting unit capable of setting a filter effect mode for artificially reproducing an image effect obtained by image-capturing using an optical filter, a display unit that displays the color image data, a ring type or dial type rotary operating unit, a rotation operation detection unit that detects a rotation operation of the rotary operating unit, and a control unit that, when a rotation operation of the rotary operating unit is detected in a case where the filter effect mode has been set, controls the image processing unit to perform image processing for varying the image effect in conjunction with the rotation operation.

23 Claims, 7 Drawing Sheets

IMAGE-CAPTURING APPARATUS AND IMAGE-CAPTURING METHOD HAVING A VARIABLE FILTER EFFECT MODE

FIELD OF THE INVENTION

This invention relates to a technique for artificially reproducing, through image processing, an image effect obtained by photographing with an optical filter.

BACKGROUND OF THE INVENTION

In a known conventional technique, an image effect obtained by photographing with a cross filter, which is a type of optical filter, is artificially reproduced through image processing without using a cross filter (see JP2007-148537A).

SUMMARY OF THE INVENTION

An image-capturing apparatus of an aspect of the present invention includes an imaging unit that generates RAW image data by capturing an object image, an image processing unit that generates color image data by implementing image processing on the RAW image data generated by the imaging unit, a processing mode setting unit capable of setting a filter effect mode for artificially reproducing an image effect obtained by image-capturing using an optical filter as a processing mode of the image processing unit, a display unit that displays the color image data generated by the image processing unit, a ring type or dial type rotary operating unit, a rotation operation detection unit that detects a rotation operation of the rotary operating unit, and a control unit that, when the rotation operation detection unit detects a rotation operation of the rotary operating unit in a case where the filter effect mode has been set by the processing mode setting unit, controls the image processing unit to perform image processing for varying the image effect in conjunction with the rotation operation.

An image-capturing method of another aspect of the present invention includes a step of generating RAW image data by capturing an object image, and a step of generating color image data by implementing image processing on the generated RAW image data. In the step of generating the color image data by implementing image processing, when a rotation operation of a ring type or dial type rotary operating unit is performed in a case where a filter effect mode for artificially reproducing an image effect obtained by image-capturing using an optical filter has been set, image processing for varying the image effect in conjunction with the rotation operation is implemented.

DETAILED DESCRIPTION OF THE PREFERRED EMBODIMENT

—First Embodiment—

Figure 1:
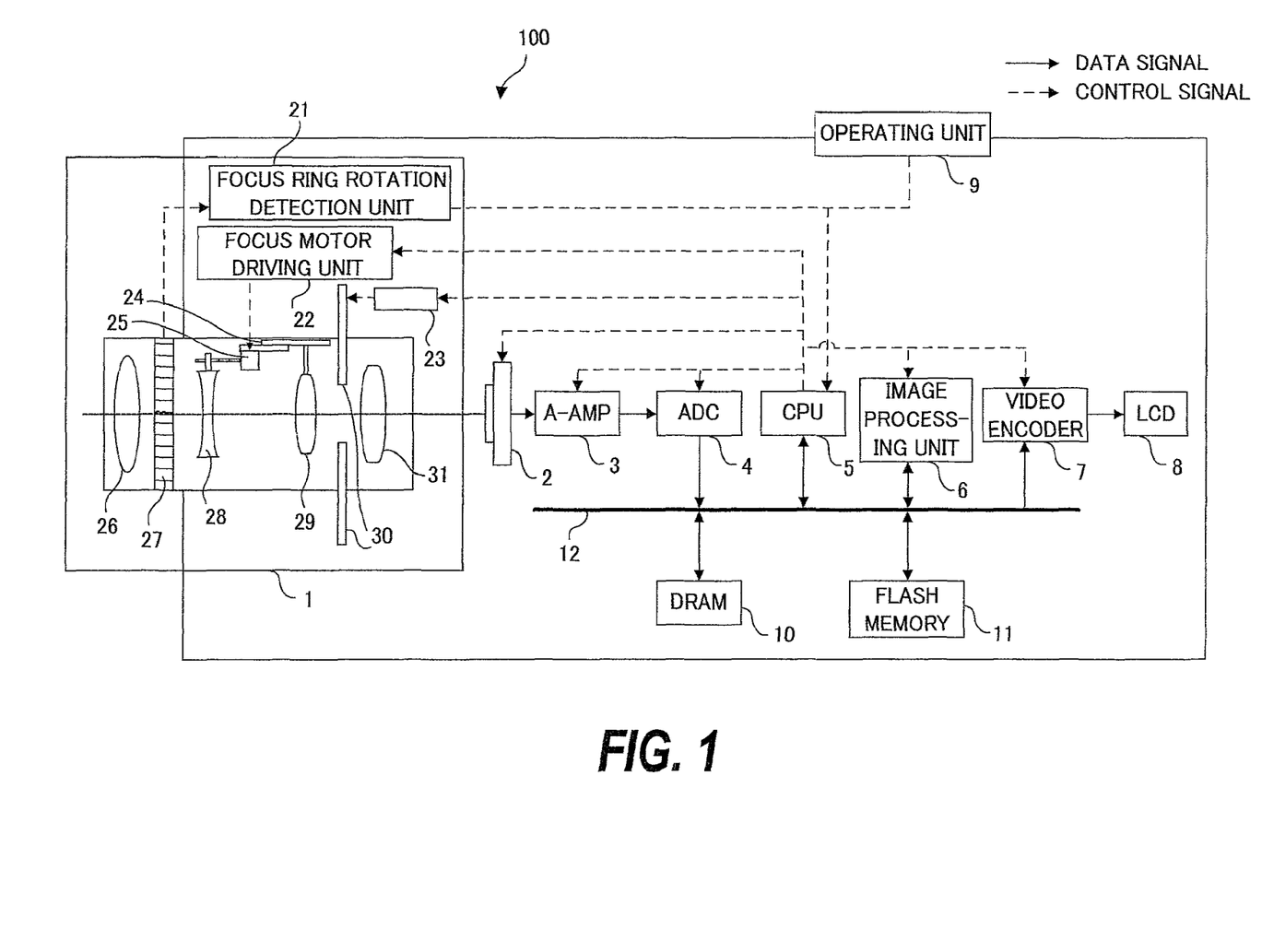
FIG. 1 is a view showing the constitution of an image-capturing apparatus according to a first embodiment.

FIG. 1 is a view showing the constitution of an image-capturing apparatus 100 according to a first embodiment. The image-capturing apparatus 100 is a single lens reflex digital camera, for example. The image-capturing apparatus according to the first embodiment includes a lens unit 1, an imaging device 2, an analog amplifier 3 (to be referred to as an A-AMP 3 hereafter), an analog-digital converter 4 (to be referred to as an ADC 4 hereafter), a CPU 5, an image processing unit 6, a video encoder 7, an LCD 8, an operating unit 9, a DRAM 10, a FLASH memory 11, and a bus 12.

The lens unit 1 includes a focus ring rotation detection unit 21, a focus motor driving unit 22, an aperture driving unit 23, a manual zoom mechanism 24, a focus motor 25, a front lens 26, a focus ring 27, a focus lens 28, a zoom lens 29, an aperture 30, and a rear lens 31.

The focus ring rotation detection unit (also referred to as a rotation operation detection unit) 21 detects a rotation operation and a rotary angle of the focus ring (also referred to as a rotary operating unit) 27.

The focus motor driving unit 22 moves the focus lens 28 by driving the focus motor 25 on the basis of a command from the CPU 5. The focus motor driving unit 22 and the focus motor 25 will also be referred to collectively as a focus lens driving unit.

The aperture driving unit 23 controls opening and closing of the aperture 30 on the basis of a command from the CPU 5.

The manual zoom mechanism 24 moves forward and backward in an optical axis direction on the basis of an operation by a user. As a result, the zoom lens 29 is moved forward and backward in the optical axis direction.

Light from an object is received by the imaging device 2 via the front lens 26, the focus lens 28, the zoom lens 29, the aperture 30, and the rear lens 31. The imaging device 2 subjects the received light to photoelectric conversion, and outputs an analog electric signal (an image signal).

The A-AMP 3 amplifies the image signal output by the imaging device 2 by a predetermined amplification factor instructed by the CPU 5.

The ADC 4 converts the analog image signal output by the A-AMP 3 into a digital image signal. The digital image signal obtained through the conversion serves as so-called RAW image data, which will also be referred to simply as image data hereafter.

The imaging device 2, the A-AMP 3, and the ADC 4 may be referred to collectively as an imaging unit.

The bus 12 is a transfer path that transfers various data generated in the interior of the image-capturing apparatus to the respective internal units of the image-capturing apparatus. The bus 12 is connected to the ADC 4, the CPU 5, the image processing unit 6, the video encoder 7, the DRAM 10, and the FLASH memory 11.

The DRAM 10 is a storage unit that temporarily stores various data such as the image data obtained in the ADC 4 and image data processed by the image processing unit 6.

The image processing unit 6 implements various types of image processing on the image data obtained in the ADC 4 and stored in the DRAM 10. Examples of the various types of image processing include noise removal processing, white balance correction processing, color correction processing, gamma conversion processing, and compression/expansion processing.

Further, on the basis of an instruction from the CPU 5, the image processing unit 6 implements image processing for artificially reproducing an image effect obtained during image-capturing using an optical filter such as a cross filter. Here, the image processing for artificially reproducing an image effect obtained during image-capturing using a cross filter will be referred to as cross filter processing.

The FLASH memory 11 records image data obtained by image-capturing. The FLASH memory 11 also stores various parameters required in an operation of the image-capturing apparatus and a program executed by the CPU 5. It should be noted that a memory card that can be attached to and detached from a camera main body may be used instead of the FLASH memory 11, which is built into the image-capturing apparatus.

The video encoder 7 performs various types of processing for displaying an image on the LCD (also referred to as a display unit) 8. More specifically, the video encoder 7 reads the image data stored in the DRAM 10, converts the read image data into a video signal, and then outputs the video signal to the LCD 8 so that an image is displayed thereon. The LCD 8 displays images obtained through image-capturing. Image display includes still image display, moving image display, and live view image display.

The video encoder 7 may output the video signal to an external device such as a television.

The CPU (also referred to as a processing mode setting unit and a control unit) 5 performs overall control of various sequences of the image-capturing apparatus. For this purpose, the CPU 5 performs various types of processing by following the program stored in the FLASH memory 11 and reading the parameters required in the various sequences from the FLASH memory 11.

The operating unit 9 includes operating members such as a release button and various input keys. The user can select a photography mode (a processing mode), for example, by operating the operating members of the operating unit 9. Information indicating that an operating member of the operating unit 9 has been operated is input into the CPU 5. The CPU 5 executes various sequences corresponding to the user operation in accordance with the operating member of the operating unit 9 operated by the user.

Figure 2:
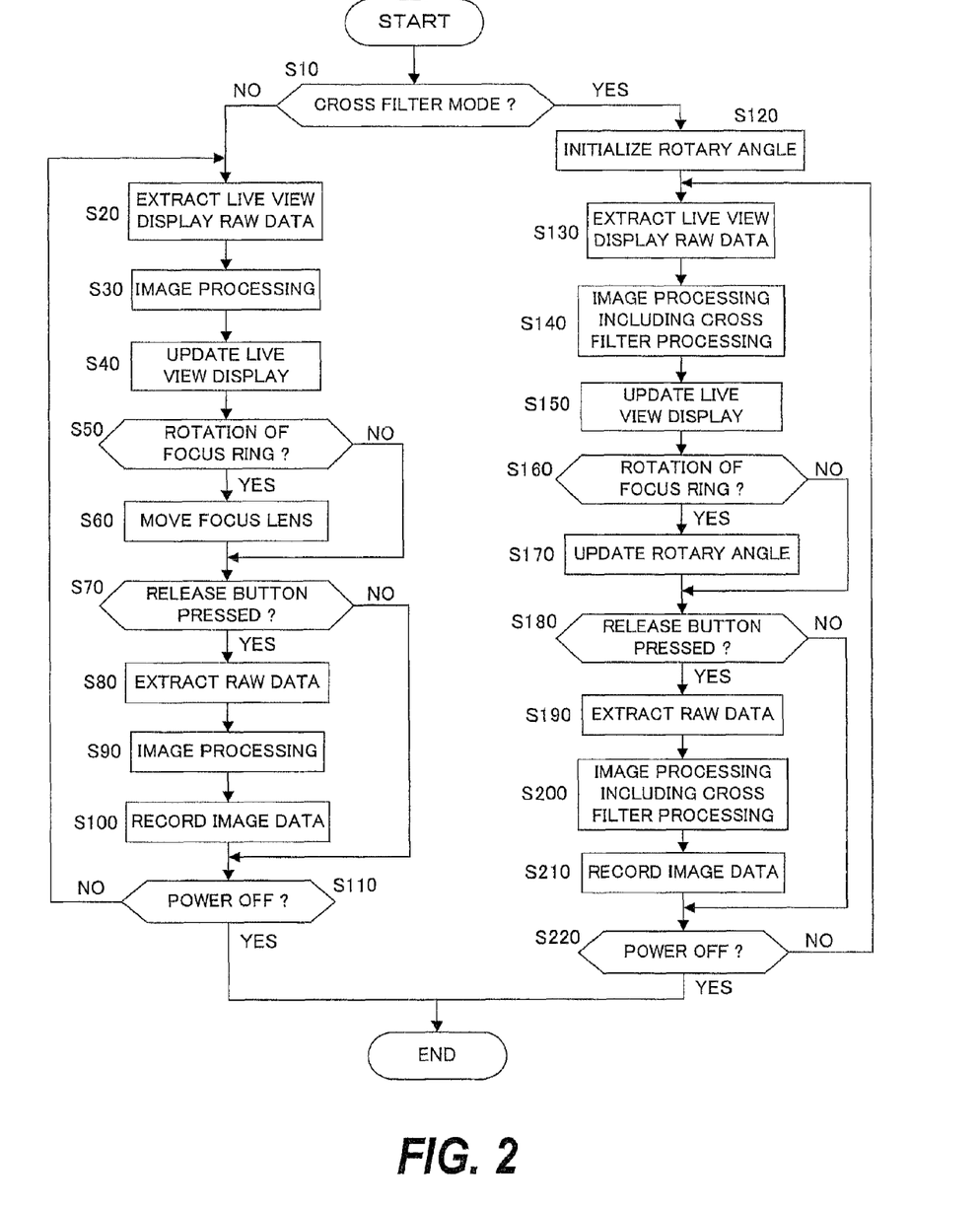
FIG. 2 is a flowchart showing a processing flow executed by the image-capturing apparatus according to the first embodiment.

FIG. 2 is a flowchart showing a processing flow executed by the image-capturing apparatus according to the first embodiment. When the user presses a power supply button such that a power supply of the digital still camera is turned ON, the CPU 5 starts the processing of a step S10.

In the step S10, a determination is made as to whether or not the photography mode is set to a cross filter mode. The cross filter mode is a mode for implementing image processing to reproduce artificially an image effect obtained by image-capturing using a cross filter on an image obtained by image-capturing not using a cross filter. The CPU 5 sets the photography mode at the cross filter mode when the user operates an operating member of the operating unit 9 to select the cross filter mode. When it is determined that the photography mode is not set to the cross filter mode, the routine advances to a step S20.

From the step S20 to a step S40, processing for realizing live view display is performed.

In the step S20, the image processing unit 6 extracts live view display RAW data obtained through image-capturing from the DRAM 10. In other words, image-capturing using a so-called electronic shutter is performed for the purpose of live view display. The image data (live view display RAW data) obtained in the image-capturing are stored temporarily in the DRAM 10, and therefore the RAW data are read from the DRAM 10.

In a step S30, the image processing unit 6 implements normal image processing on the RAW data extracted in the step S20. Normal image processing is image processing performed when the photography mode is not set to the cross filter mode, and includes noise removal processing, white balance correction processing, color correction processing, gamma conversion processing, compression processing, and so on, for example. Following the image processing, the image data are stored temporarily in the DRAM 10.

In the step S40, the video encoder 7 reads the image data subjected to image processing by the image processing unit 6 from the DRAM 10 and performs various types of image display processing on the read image data to display the image data on the LCD 8. This display is so-called live view display.

In a step S50, a determination is made as to whether or not the focus ring 27 has been rotated. This determination is made on the basis of a signal input from the focus ring rotation detection unit 21. When it is determined that the focus ring 27 has been rotated, the routine advances to a step S60, and when it is determined that the focus ring 27 has not been rotated, the routine advances to a step S70.

In the step S60, a command to move the focus lens 28 is output to the focus motor driving unit 22 on the basis of the rotary angle of the focus ring 27 detected by the focus ring rotation detection unit 21. The command includes a movement amount of the focus lens 28. On the basis of the command from the CPU 5, the focus motor driving unit 22 drives the focus lens 28.

In a step S70, a determination is made as to whether or not the release button has been pressed down by the user. When the release button is pressed down, image-capturing is performed. When it is determined that the release button has been pressed down, the routine advances to a step S80, and when it is determined that the release button has not been pressed down, the routine advances to a step S110.

In the step S80, the image processing unit 6 extracts recording RAW data obtained in the image-capturing from the DRAM 10. More specifically, when the release button is pressed down, still image-capturing is performed. The image data (recording RAW data) obtained in the still image-capturing are stored temporarily in the DRAM 10, and therefore the RAW data are read from the DRAM 10. It should be noted that when the photography mode is set to a moving image mode, image data (RAW data) obtained through moving image-capturing are read from the DRAM 10.

In a step S90, the image processing unit 6 implements normal image processing on the RAW data extracted in the step S80. Normal image processing is image processing performed when the photography mode is not set to the cross filter mode, and includes noise removal processing, white balance correction processing, color correction processing, gamma conversion processing, compression processing, and so on, for example. Following the image processing, the image data are stored temporarily in the DRAM 10.

In a step S100, the image data subjected to image processing by the image processing unit 6 are read from the DRAM 10 and recorded in the FLASH memory 11.

In the step S110, a determination is made as to whether or not the power supply of the image-capturing apparatus has been switched OFF. When it is determined that the power supply is not OFF, the routine returns to the step S20, and the processing described above is performed. When the user has pressed the power supply button to turn the power supply OFF, on the other hand, the processing of the flowchart is terminated.

When it is determined in the step S10 that the photography mode is set to the cross filter mode, on the other hand, the routine advances to a step S120. In the step S120, a cross filter rotary angle is initialized. The cross filter rotary angle is an angle used when performing cross filter processing, and will be described in detail below.

In a step S130, the image processing unit 6 extracts the live view display RAW data obtained in the image-capturing from the DRAM 10. This processing is identical to the processing performed in the step S20.

In a step S140, the image processing unit 6 implements image processing including the cross filter processing on the RAW data extracted in the step S130. Examples of image processing other than the cross filter processing include noise removal processing, white balance correction processing, color correction processing, gamma conversion processing, and compression processing. Following the image processing, the image data are stored temporarily in the DRAM 10.

Figure 3A:
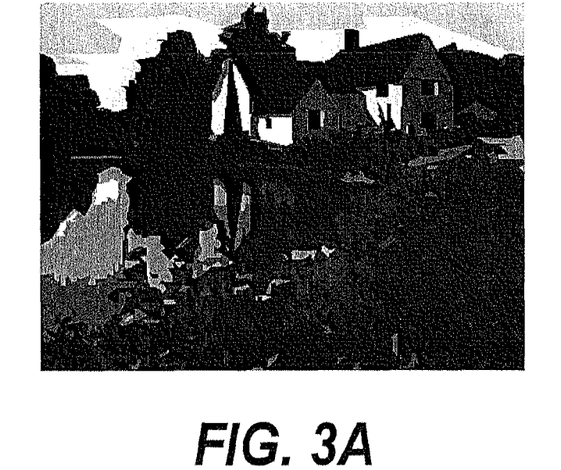
FIG. 3A is a view showing an example of an image prior to implementation of the cross filter processing.
Figure 3B:
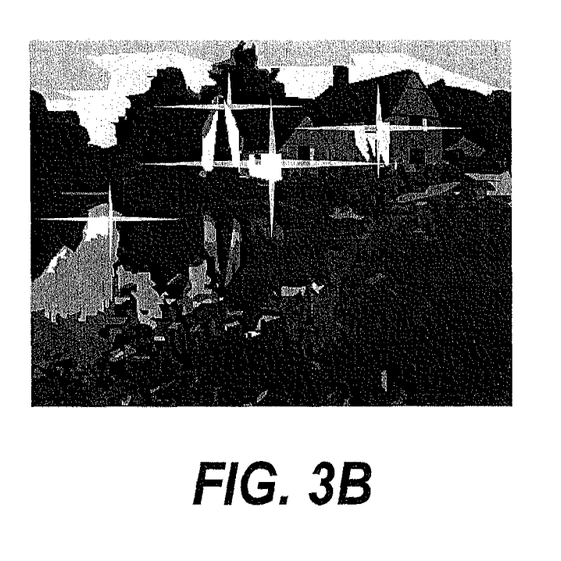
FIG. 3B is a view showing an example of the image following the implementation of the cross filter processing.

The cross filter processing will now be described using FIGS. 3A and 3B. FIG. 3A is a view showing an example of an image prior to implementation of the cross filter processing. FIG. 3B is a view showing an example of the image following the implementation of the cross filter processing. In the cross filter processing, as shown in FIG. 3B, processing is implemented to add light (to be referred to hereafter as light rays) emanating radially from image positions having high luminance, such as house lights. In the example shown in FIG. 3B, the light rays are cross-shaped, but the light rays are not limited to a cross shape, and may emanate in six directions or eight directions, for example.

In a step S150, the video encoder 7 reads the image data subjected to image processing by the image processing unit 6 from the DRAM 10 and performs various types of image display processing on the read image data to display the image data on the LCD 8. This display is so-called live view display.

In a step S160, a determination is made as to whether or not the focus ring 27 has been rotated. This determination is made on the basis of a signal input from the focus ring rotation detection unit 21. When it is determined that the focus ring 27 has been rotated, the routine advances to a step S170, and when it is determined that the focus ring 27 has not been rotated, the routine advances to a step S180.

In the step S170, the cross filter rotary angle is set in accordance with the rotary angle of the focus ring 27 input from the focus ring rotation detection unit 21. Here, the cross filter rotary angle is set to be equal to the rotary angle of the focus ring 27. For example, when the rotary angle of the focus ring 27 is 30 degrees, the cross filter rotary angle is likewise set at 30 degrees.

In a step S180, a determination is made as to whether or not the release button has been pressed down by the user. When the release button is pressed down, image-capturing is performed. When it is determined that the release button has been pressed down, the routine advances to a step S190, and when it is determined that the release button has not been pressed down, the routine advances to a step S220.

In the step S190, the image processing unit 6 extracts recording RAW data obtained in the image-capturing from the DRAM 10. This processing is identical to the processing performed in the step S80.

In a step S200, the image processing unit 6 implements image processing including the cross filter processing on the RAW data extracted in the step S190. Examples of the image processing other than the cross filter processing include noise removal processing, white balance correction processing, color correction processing, gamma conversion processing, and compression processing. Following the image processing, the image data are stored temporarily in the DRAM 10. The cross filter processing performed in the step S200 will now be described in detail using FIGS. 4A and 4B.

Figure 4A:
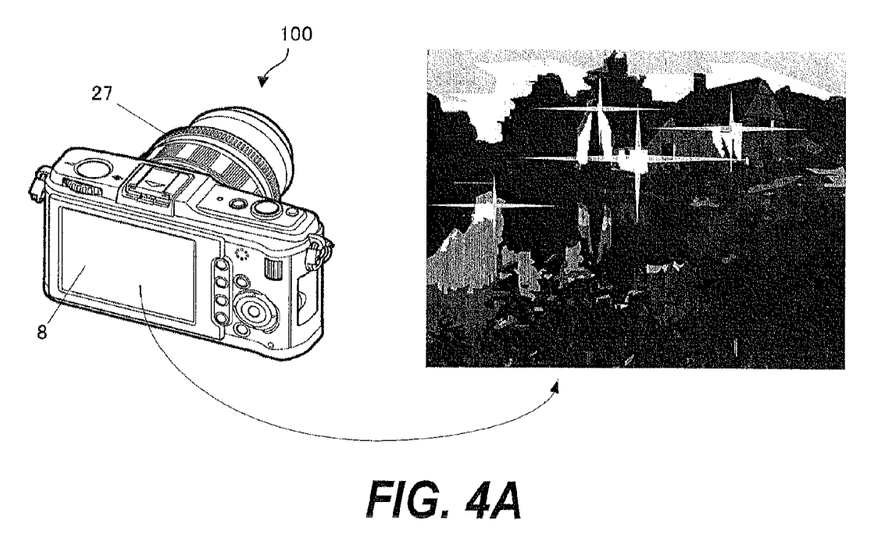
FIG. 4A shows an image displayed when a focus ring has not been rotated when a photography mode is set to a cross filter mode.
Figure 4B:
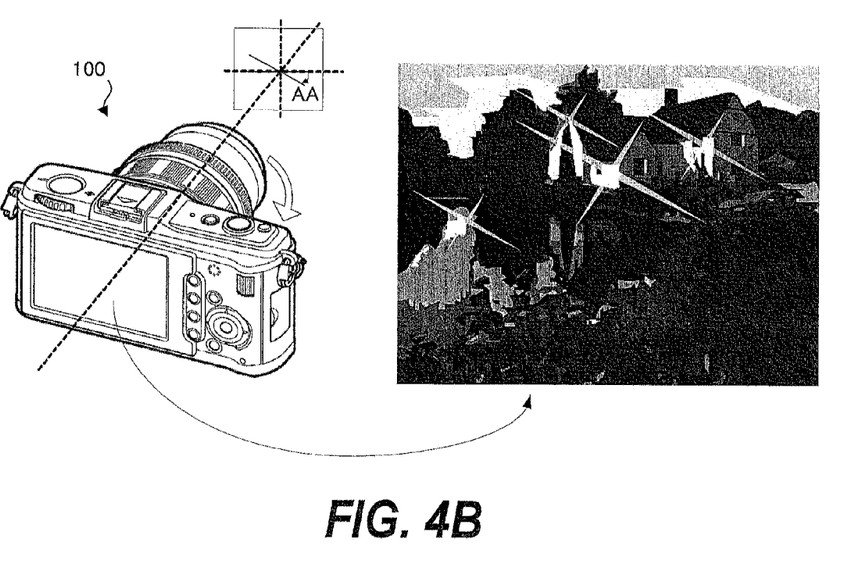
FIG. 4B shows an image displayed when the focus ring has been rotated when the photography mode is set to the cross filter mode.

FIGS. 4A and 4B are views showing the image-capturing apparatus 100 together with images displayed on the LCD 8 of the image-capturing apparatus 100 when the photography mode is set to the cross filter mode. FIG. 4A shows an image displayed when the focus ring 27 has not been rotated and FIG. 4B shows an image displayed when the focus ring 27 has been rotated.

When the focus ring 27 has not been rotated, or in other words when the cross filter rotary angle is 0 degrees, the light rays added to the image in the cross filter processing take a cross shape extending in up, down, left, and right directions of the image. When, on the other hand, the focus ring 27 has been rotated, or in other words when the cross filter rotary angle is AA degrees (0<AA<360), the light rays added to the image take a shape rotated by AA degrees, using the cross shape shown in FIG. 4A as a reference (see FIG. 4B).

More specifically, when the CPU 5 detects that the focus ring 27 has been rotated in a case where the photography mode is set to the cross filter mode, the CPU 5 causes the image processing unit 6 to perform image processing for adding light rays to image positions having high luminance after rotating the light rays to be added to the image by an identical angle to the focus rotation angle detected by the focus ring rotation detection unit 21. Hence, the user can rotate the light rays on the image by performing an intuitive operation, i.e. rotating the focus ring 27, similarly to the manner in which light rays on an image are rotated by rotating a cross filter in the case of a camera attached with a cross filter.

In a step S210, the image data subjected to image processing by the image processing unit 6 are read from the DRAM 10 and recorded in the FLASH memory 11.

In the step S220, a determination is made as to whether or not the power supply of the image-capturing apparatus has been switched OFF. When it is determined that the power supply is not OFF, the routine returns to the step S130, and the processing described above is performed. When the user has pressed the power supply button to turn the power supply OFF, on the other hand, the processing of the flowchart is terminated.

When the power supply has not been switched OFF, the processing of the steps S130 to S150 is repeated. In other words, during the live view display, image variation (rotary variation of the light rays) corresponding to the rotation operation of the focus ring 27 is displayed instantaneously on the LCD 8.

With the image-capturing apparatus according to the first embodiment, described above, when a rotation operation of the focus ring 27 serving as the rotary operating unit is detected while the photography mode is set to the cross filter mode in an image-capturing apparatus capable of artificially reproducing an image effect obtained by image-capturing using a cross filter through image processing, image processing is performed such that the artificially reproduced image effect varies in conjunction with the rotation operation. As a result, the user can vary the artificially reproduced image effect by performing the intuitive operation of rotating the focus ring 27, i.e. a similar operation to rotating a cross filter. Further, by using the focus ring 27, which is a pre-existing operating member, a new operating member does not have to be disposed, and therefore increases in cost and number of components can be suppressed.

Here, the artificially reproduced image effect may also be varied by operating a button provided on the camera main body. However, such an operation cannot be said to be intuitive to a user accustomed to rotating a cross filter. The operation to rotate the focus ring 27, on the other hand, is identical to an operation to rotate a cross filter, enabling an improvement in user-friendliness.

With the image-capturing apparatus according to the first embodiment in particular, image processing is performed such that the artificially reproduced image effect varies by an amount corresponding to the variation in the rotary angle of the focus ring 27, and therefore the user can easily understand the degree to which the focus ring 27 needs to be rotated to obtain a desired image.

Further, during live view display, image variation corresponding to the rotation operation of the focus ring 27 is displayed instantaneously on the LCD 8, and therefore the user can rotate the focus ring 27 before the actual image-capturing operation and perform image-capturing while checking the image to be obtained in the image-capturing operation on the LCD 8.

—Second Embodiment—

Figure 5:
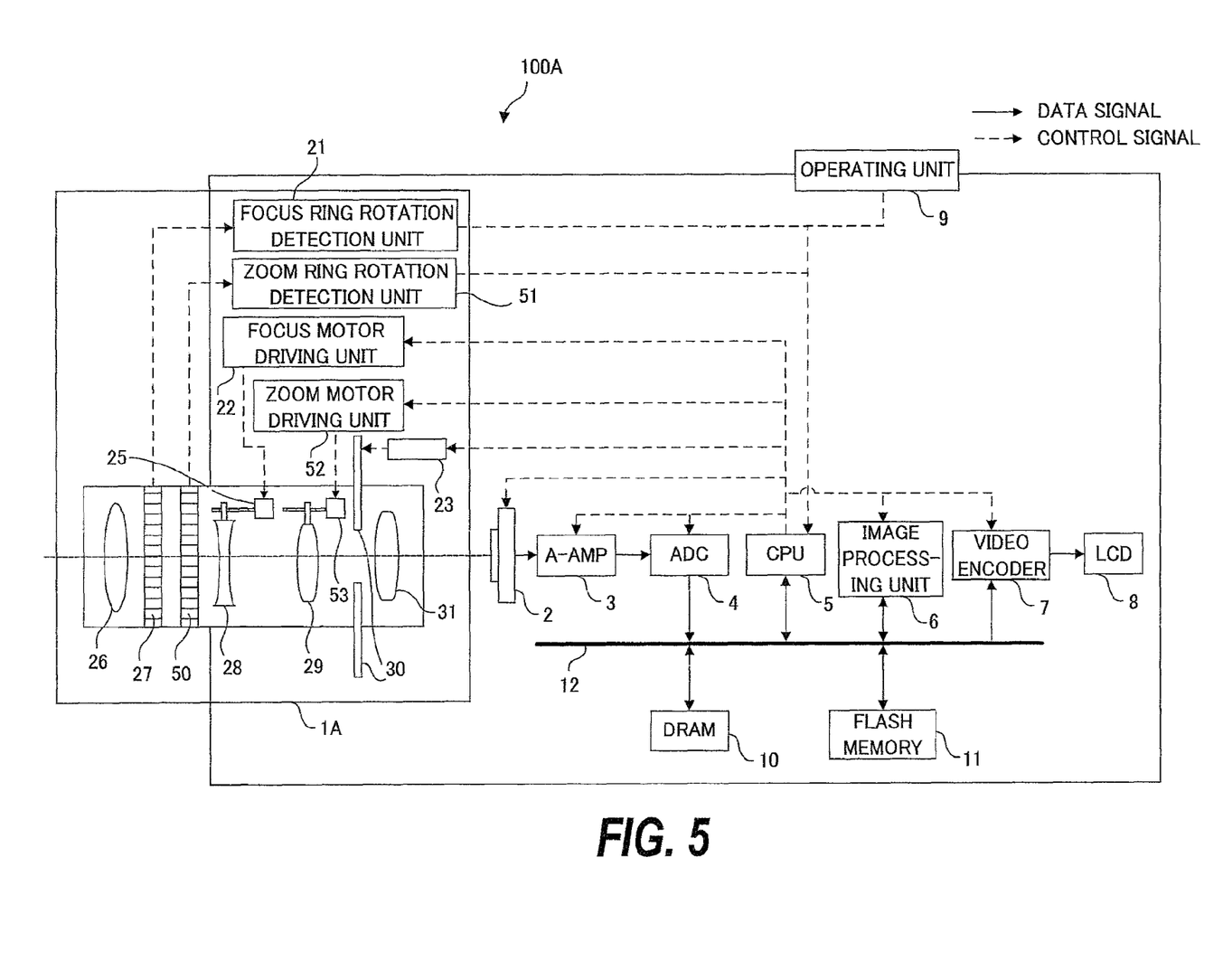
FIG. 5 is a view showing the constitution of an image-capturing apparatus according to a second embodiment.

FIG. 5 is a view showing the constitution of an image-capturing apparatus 100A according to a second embodiment. Identical constitutional elements to those of the image-capturing apparatus 100 according to the first embodiment have been allocated identical reference numerals, and detailed description thereof has been omitted. The image-capturing apparatus 100A according to the second embodiment differs from the image-capturing apparatus 100 according to the first embodiment in the internal constitution of the lens unit. A lens unit 1A according to the second embodiment further includes, in addition to the constitutional elements of the lens unit 1 according to the first embodiment, a zoom ring 50, a zoom ring rotation detection unit 51, a zoom motor driving unit 52, and a zoom motor 53.

The zoom ring rotation detection unit (also referred to as a rotation operation detection unit) 51 detects a rotation operation and a rotary angle of the zoom ring (also referred to as a rotary operating unit) 50.

The zoom motor driving unit. 52 moves the zoom lens 29 by driving the zoom motor 53 on the basis of a command from the CPU 5. The zoom motor driving unit 52 and the zoom motor 53 will also be referred to collectively as a zoom lens driving unit.

In the image-capturing apparatus according to the first embodiment, when a rotation operation of the focus ring 27 is detected while the photography mode is set to the cross filter mode, the light rays added to image positions having high luminance are rotated in accordance with the rotation operation of the focus ring 27. In the image-capturing apparatus according to the second embodiment, when a rotation operation of the zoom ring 50 is detected while the photography mode is set to the cross filter mode, the light rays added to image positions having high luminance are rotated in accordance with the rotation operation of the zoom ring 50.

Figure 6:
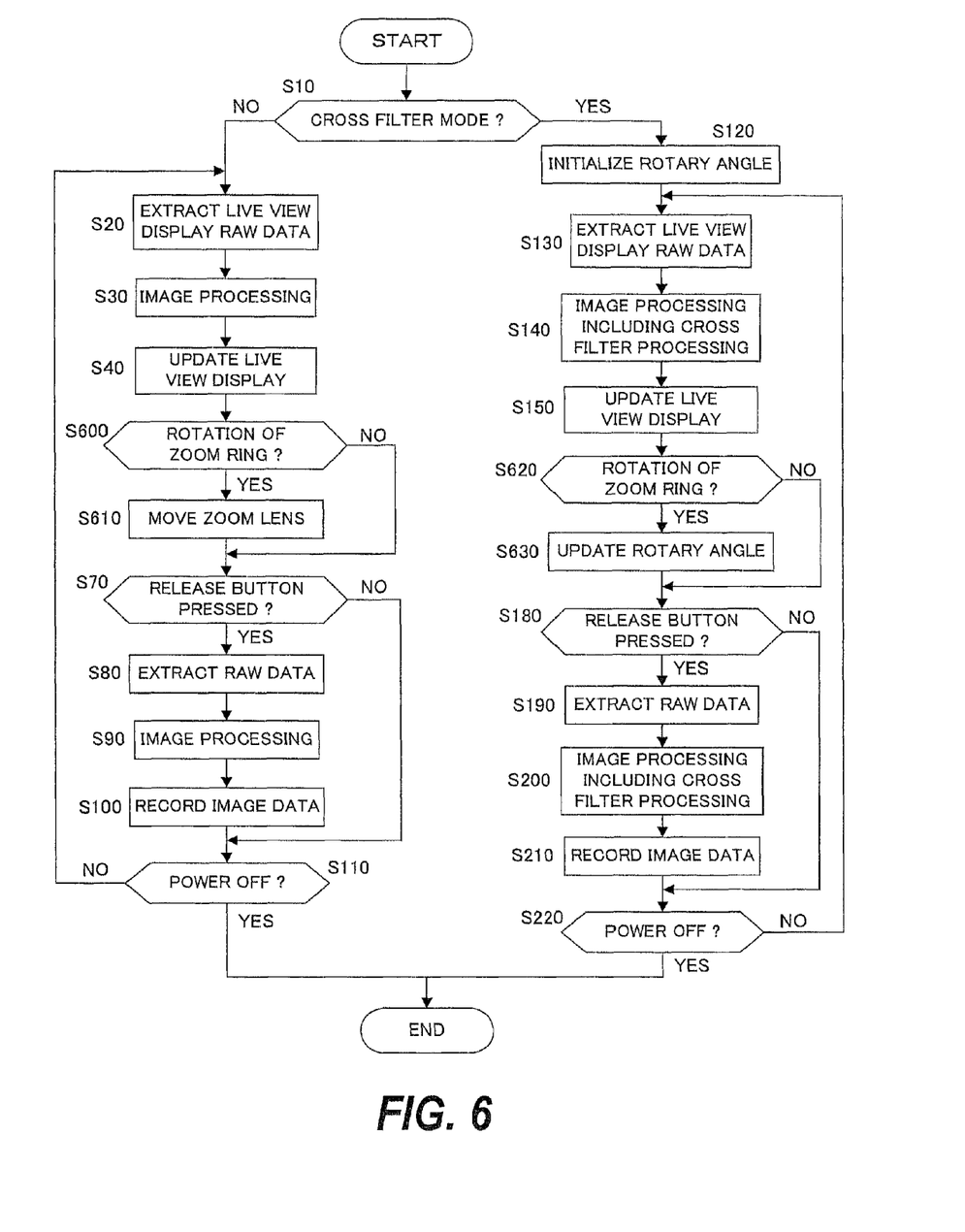
FIG. 6 is a flowchart showing a processing flow executed by the image-capturing apparatus according to the second embodiment.

FIG. 6 is a flowchart showing a processing flow executed by the image-capturing apparatus according to the second embodiment. Steps in which identical processing to the processing of the flowchart shown in FIG. 2 is performed have been allocated identical reference numerals, and detailed description thereof has been omitted. Steps in which different processing to that of the flowchart shown in FIG. 2 is performed will be described below.

In a step S600 following the step S40, a determination is made as to whether or not the zoom ring 50 has been rotated. This determination is made on the basis of a signal input from the zoom ring rotation detection unit 51. When it is determined that the zoom ring 50 has been rotated, the routine advances to a step S610, and when it is determined that the zoom ring 50 has not been rotated, the routine advances to the step S70.

In the step S610, a command to move the zoom lens 29 is output to the zoom motor driving unit 52 on the basis of the rotary angle of the zoom ring 50 detected by the zoom ring rotation detection unit 51. The command includes the movement amount of the zoom lens 29. On the basis of the command from the CPU 5, the zoom motor driving unit 52 drives the zoom lens 29.

In a step S620 following the step S150, a determination is made as to whether or not the zoom ring 50 has been rotated. This determination is made on the basis of a signal input from the zoom ring rotation detection unit 51. When it is determined that the zoom ring 50 has been rotated, the routine advances to a step S630, and when it is determined that the zoom ring 50 has not been rotated, the routine advances to the step S180.

In the step S630, the cross filter rotary angle is set in accordance with the rotary angle of the zoom ring 50 input from the zoom ring rotation detection unit 51. Here, the cross filter rotary angle is set to be equal to the rotary angle of the zoom ring 50. For example, when the rotary angle of the zoom ring 50 is 30 degrees, the cross filter rotary angle is likewise set at 30 degrees.

With the image-capturing apparatus according to the second embodiment, described above, when a rotation operation of the zoom ring 50 serving as the rotary operating unit is detected while the photography mode is set to the cross filter mode in an image-capturing apparatus capable of artificially reproducing an image effect obtained by image-capturing using a cross filter through image processing, image processing is performed such that the artificially reproduced image effect varies in conjunction with the rotation operation. As a result, the user can vary the artificially reproduced image effect by performing the intuitive operation of rotating the zoom ring 50, i.e. a similar operation to rotating a cross filter. Further, by using the zoom ring 50, which is a pre-existing operating member, a new operating member does not have to be disposed, and therefore increases in cost and number of components can be suppressed.

—Third Embodiment—

By attaching a polarizing filter to an image-capturing apparatus and performing image-capturing after adjusting the rotary angle of the polarizing filter, an image in which the blue of blue sky appears deeper can be obtained. In an image-capturing apparatus according to a third embodiment, a polarizing filter mode can be set as the photography mode. The polarizing filter mode is a mode for implementing image processing to reproduce artificially an image effect obtained during image-capturing using a polarizing filter on an image obtained during image-capturing not using a polarizing filter. When a rotation operation of the focus ring 27 is detected while the photography mode is set to the polarizing filter mode in the image-capturing apparatus according to the third embodiment, image processing is implemented to obtain an image effect equivalent to an effect obtained when a polarizing filter is actually attached.

A processing flow executed by the image-capturing apparatus according to the third embodiment is identical to the processing flow of the flowchart shown in FIG. 2. In the step S10, however, a determination is made as to whether or not the photography mode is set to the polarizing filter mode, and in the step S140, cross filter processing is not performed. Further, in the step S200, image processing is performed to obtain an image effect corresponding to the rotary angle of the focus ring 27.

Figure 7A:
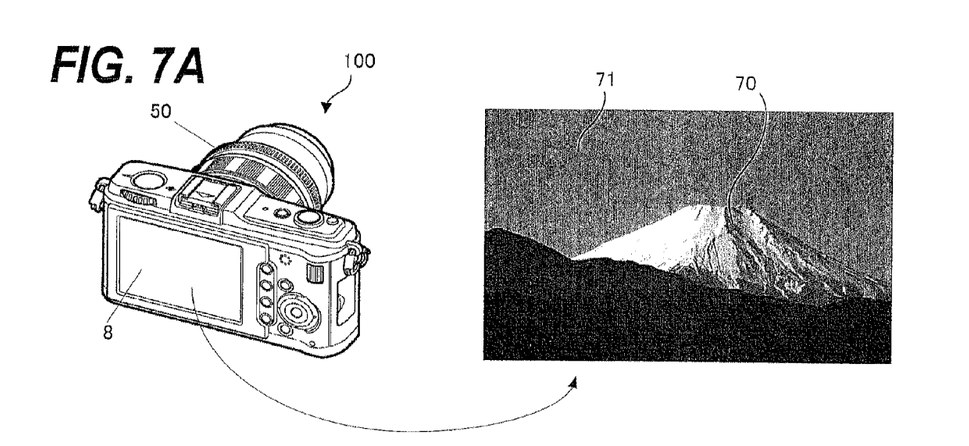
FIG. 7A shows an image displayed when the focus ring has not been rotated when the photography mode is set to a polarizing filter mode.
Figure 7B:
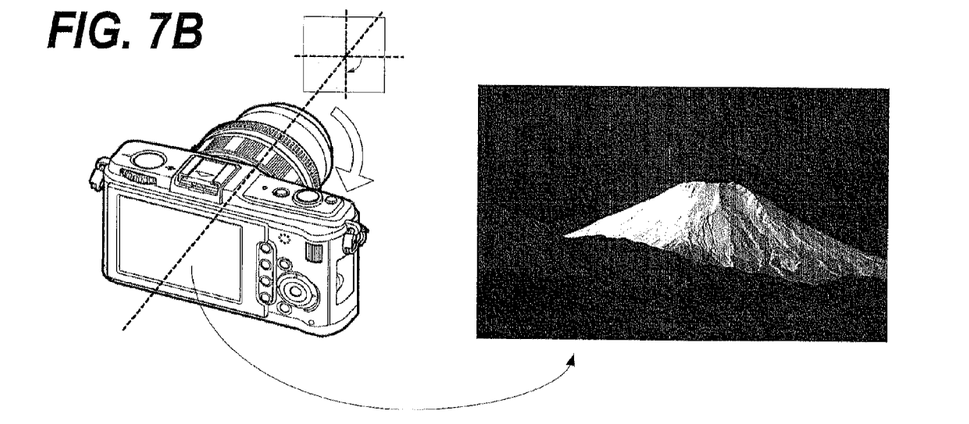
FIG. 7B shows an image displayed when the focus ring has been rotated 90 degrees when the photography mode is set to the polarizing filter mode.
Figure 7C:
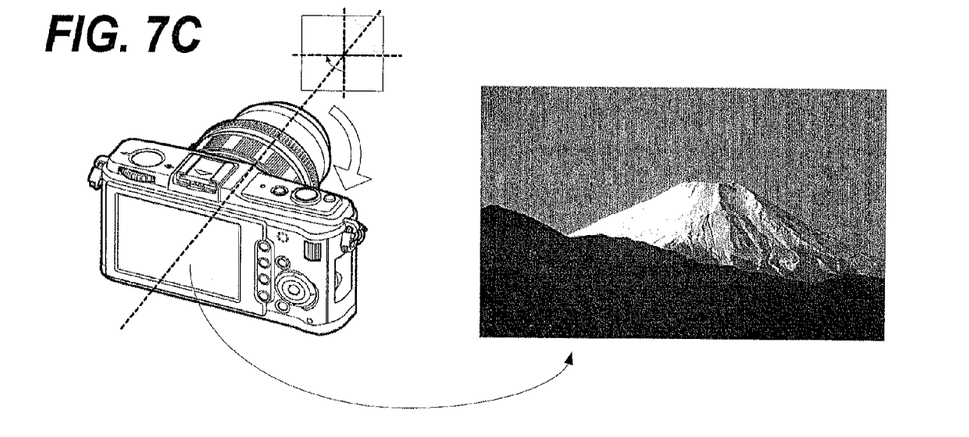
FIG. 7C shows an image displayed when the focus ring has been rotated 180 degrees when the photography mode is set to the polarizing filter mode.

FIGS. 7A to 7C are views showing the image-capturing apparatus 100 together with images displayed on the LCD 8 of the image-capturing apparatus 100 when the photography mode is set to the polarizing filter mode. FIG. 7A shows an image displayed when the focus ring 27 has not been rotated, FIG. 7B shows an image displayed when the focus ring 27 has been rotated 90 degrees, and FIG. 7C shows an image displayed when the focus ring 27 has been rotated 180 degrees. The images of FIGS. 7A to 7C all show Mt. Fuji 70 together with blue sky 71.

Blue sky exhibits intense polarization due to Rayleigh scattering, and therefore a high degree of light blocking is produced by a polarizing filter. Hence, when the polarizing filter is rotated, the lightness of objects other than the blue sky does not vary, but the blue sky darkens from its original lightness.

In this embodiment, a condition in which a blue sky lightness suppression effect is at its weakest is set as an initial condition (see FIG. 7A), and as the focus ring 27 is rotated little by little, the lightness of the blue sky gradually decreases such that when the focus ring 27 has been rotated 90 degrees, the lightness of the blue sky is most reduced (see FIG. 7B). Further, as the focus ring 27 is rotated little by little from the condition in which the lightness of the blue sky is most reduced (see FIG. 7B), the lightness of the blue sky gradually increases such that when the focus ring 27 has been rotated 180 degrees from the initial condition, the blue sky returns to the lightness of the initial condition (see FIG. 7C).

When the CPU 5 detects that the focus ring 27 has been rotated in a case where the photography mode is set to the cross filter mode, the CPU 5 causes the image processing unit 6 to perform image processing for varying the lightness of the blue sky in the image in accordance with the rotation operation of the focus ring 27. A blue sky region in the image may be determined using a known method.

With the image-capturing apparatus according to the third embodiment, described above, when a rotation operation of the focus ring 27 serving as the rotary operating unit is detected while the photography mode is set to the polarizing filter mode, image processing is performed to vary the lightness of the blue sky in the image in conjunction with the rotation operation. As a result, the user can vary the lightness of the blue sky in the image by performing the intuitive operation of rotating the focus ring 27, i.e. a similar operation to rotating a polarizing filter. Further, by using the focus ring 27, which is a pre-existing operating member, a new operating member does not have to be disposed, and therefore increases in cost and number of components can be suppressed.

It should be noted that in the image-capturing apparatus according to the third embodiment, similar processing may be performed using the zoom ring 50 instead of the focus ring 27. In other words, when a rotation operation of the zoom ring 50 serving as the rotary operating unit is detected while the photography mode is set to the polarizing filter mode, image processing may be performed to vary the lightness of the blue sky in the image in conjunction with the rotation operation.

This invention is not limited to the first to third embodiments described above, and may be subjected to various modifications and applied in various ways within a scope that does not depart from the spirit of the invention. For example, the image-capturing apparatus 100 was described as a single lens reflex digital camera, but may be a compact digital camera including a focus ring or a compact digital camera including a zoom ring.

In the above embodiments, the cross filter rotary angle is set to be equal to the rotary angle of the focus ring 27 or the rotary angle of the zoom ring 50. However, as long as the cross filter rotary angle is set in accordance with the rotary angle of the focus ring 27 or the rotary angle of the zoom ring 50, the rotary angles may be set at different angles. For example, the cross filter rotary angle may be set at half the rotary angle of the focus ring 27 or half the rotary angle of the zoom ring.

The cross filter mode and the polarizing filter mode were cited in the above description as examples of a filter effect mode for artificially reproducing an image effect obtained by image-capturing using an optical filter, but the filter effect mode is not limited thereto.

The focus ring 27 and the zoom ring 50 were cited in the above description as examples of the rotary operating unit for varying the artificially reproduced image effect, but the rotary operating unit may be any ring type or dial type operating member and is not limited to the focus ring 27 and the zoom ring 50. Further, the rotary operating unit is not limited to a constitution provided in the lens unit, and may be provided on the camera main body.

In the image-capturing apparatus according to the second embodiment, when a rotation operation of the zoom ring 50 is detected while the photography mode is set to the cross filter mode, the light rays added to image positions having high luminance are rotated in accordance with the rotation operation of the zoom ring 50. However, the user may be allowed to select either the focus ring 27 or the zoom ring 50 for use as the rotary operating unit for varying the artificially reproduced image effect.

This application claims priority based on JP2010-177420, filed with the Japan Patent Office on Aug. 6, 2010, the entire contents of which are incorporated into this specification by reference.

What is claimed is:

1. An image-capturing apparatus comprising:
an imaging unit that generates RAW image data by capturing an object image;
an image processing unit that generates color image data by implementing image processing on the RAW image data generated by the imaging unit;
a processing mode setting unit capable of setting a filter effect mode for artificially reproducing an image effect obtained by image-capturing using an optical filter capable of changing the image effect by being rotated around an optical axis as a processing mode of the image processing unit;
a display unit that displays the color image data generated by the image processing unit;
a ring type or dial type rotary operating unit;

a rotation operation detection unit that detects a rotation operation of the rotary operating unit; and a control unit that, when the rotation operation detection unit detects a rotation operation of the rotary operating unit in a case where the filter effect mode has been set by the processing mode setting unit, controls the image processing unit to perform image processing for varying the image effect in conjunction with the rotation operation.

2. The image-capturing apparatus as defined in claim 1, wherein
the rotation operation detection unit detects a rotary angle of the rotary operating unit as well as the rotation operation thereof, and
the control unit controls the image processing unit to perform image processing for varying the image effect by an amount corresponding to variation in the rotary angle detected by the rotation operation detection unit.

3. The image-capturing apparatus as defined in claim 2, wherein
the control unit displays variation in the image effect corresponding to the rotation operation of the rotary operating unit instantaneously on the display unit during display of a live view image.

4. The image-capturing apparatus as defined in claim 3, further comprising:
a focus lens; and
a focus lens driving unit that drives the focus lens, wherein:
the rotary operating unit is a focus ring, and
the control unit controls the focus lens driving unit to drive the focus lens in accordance with the rotation operation of the focus ring when the filter effect mode has not been set by the processing mode setting unit.

5. The image-capturing apparatus as defined in claim 3, further comprising:
a zoom lens; and
a zoom lens driving unit that drives the zoom lens, wherein:
the rotary operating unit is a zoom ring, and
the control unit controls the zoom lens driving unit to drive the zoom lens in accordance with the rotation operation of the zoom ring when the filter effect mode has not been set by the processing mode setting unit.

6. The image-capturing apparatus as defined in claim 2, further comprising:
a focus lens; and
a focus lens driving unit that drives the focus lens, wherein:
the rotary operating unit is a focus ring, and
the control unit controls the focus lens driving unit to drive the focus lens in accordance with the rotation operation of the focus ring when the filter effect mode has not been set by the processing mode setting unit.

7. The image-capturing apparatus as defined in claim 2, further comprising:
a zoom lens; and
a zoom lens driving unit that drives the zoom lens, wherein:
the rotary operating unit is a zoom ring, and
the control unit controls the zoom lens driving unit to drive the zoom lens in accordance with the rotation operation of the zoom ring when the filter effect mode has not been set by the processing mode setting unit.

8. The image-capturing apparatus as defined in claim 2, wherein
the image effect obtained by image-capturing using the optical filter is an image effect obtained by image-capturing using a cross filter.

9. The image-capturing apparatus as defined in claim 2, wherein
the image effect obtained by image-capturing using the optical filter is an image effect obtained by image-capturing using a polarizing filter.

10. The image-capturing apparatus as defined in claim 1, wherein
the control unit displays variation in the image effect corresponding to the rotation operation of the rotary operating unit instantaneously on the display unit during display of a live view image.

11. The image-capturing apparatus as defined in claim 10, further comprising:
a focus lens; and
a focus lens driving unit that drives the focus lens, wherein:
the rotary operating unit is a focus ring, and
the control unit controls the focus lens driving unit to drive the focus lens in accordance with the rotation operation of the focus ring when the filter effect mode has not been set by the processing mode setting unit.

12. The image--capturing apparatus as defined in claim 10, further comprising:
a zoom lens; and
a zoom lens driving unit that drives the zoom lens, wherein:
the rotary operating unit is a zoom ring, and
the control unit controls the zoom lens driving unit to drive the zoom lens in accordance with the rotation operation of the zoom ring when the filter effect mode has not been set by the processing mode setting unit.

13. The image-capturing apparatus as defined in claim 10, wherein
the image effect obtained by image-capturing using the optical filter is an image effect obtained by image-capturing using a cross filter.

14. The image-capturing apparatus as defined in claim 10, wherein
the image effect obtained by image-capturing using the optical filter is an image effect obtained by image-capturing using a polarizing filter.

15. The image-capturing apparatus as defined in claim 1, further comprising:
a focus lens; and
a focus lens driving unit that drives the focus lens, wherein:
the rotary operating unit is a focus ring, and
the control unit controls the focus lens driving unit to drive the focus lens in accordance with the rotation operation of the focus ring when the filter effect mode has not been set by the processing mode setting unit.

16. The image-capturing apparatus as defined in claim 15, wherein
the image effect obtained by image-capturing using the optical filter is an image effect obtained by image-capturing using a cross filter.

17. The image-capturing apparatus as defined in claim 15, wherein
the image effect obtained by image-capturing using the optical filter is an image effect obtained by image-capturing using a polarizing filter.

18. The image-capturing apparatus as defined in claim 1, further comprising:
a zoom lens; and
a zoom lens driving unit that drives the zoom lens, wherein:
the rotary operating unit is a zoom ring, and
the control unit controls the zoom lens driving unit to drive the zoom lens in accordance with the rotation operation of the zoom ring when the filter effect mode has not been set by the processing mode setting unit.

19. The image-capturing apparatus as defined in claim 18, wherein the image effect obtained by image-capturing using the optical filter is an image effect obtained by image-capturing using a cross filter.

20. The image-capturing apparatus as defined in claim 18, wherein
the image effect obtained by image-capturing using the optical filter is an image effect obtained by image-capturing using a polarizing filter.

21. The image-capturing apparatus as defined in claim 1, wherein
the image effect obtained by image-capturing using the optical filter is an image effect obtained by image-capturing using a cross filter.

22. The image-capturing apparatus as defined in claim 1, wherein
the image effect obtained by image-capturing using the optical filter is an image effect obtained by image-capturing using a polarizing filter.

23. An image-capturing method comprising:
a step of generating RAW image data by capturing an object image; and
a step of generating color image data by implementing image processing on the generated RAW image data, wherein:
in the step of generating the color image data by implementing image processing, when a rotation operation of a ring type or dial type rotary operating unit is performed in a case where a filter effect mode for artificially reproducing an image effect obtained by image-capturing using an optical filter capable of changing that image effect by being rotated around an optical axis has been set, image processing for varying the image effect in conjunction with the rotation operation is implemented.

* * * * *